United States Patent
Ryan et al.

(10) Patent No.: US 8,010,905 B2
(45) Date of Patent: Aug. 30, 2011

(54) OPEN MODEL INGESTION FOR MASTER DATA MANAGEMENT

(75) Inventors: Thomas K. Ryan, Valley Center, CA (US); Brian J. Wasserman, Escondido, CA (US); Yabing Bi, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 899 days.

(21) Appl. No.: 12/002,982

(22) Filed: Dec. 19, 2007

(65) Prior Publication Data

US 2009/0164943 A1    Jun. 25, 2009

(51) Int. Cl.
  G06F 13/00    (2006.01)
  G06F 15/00    (2006.01)
(52) U.S. Cl. ........................ 715/765; 715/763
(58) Field of Classification Search .......... 715/761–765, 715/850–853, 715–722, 744; 707/5, 106
See application file for complete search history.

(56) References Cited

U.S. PATENT DOCUMENTS 7,461,077 B1 *   12/2008   Greenwood ............................ 1/1
7,620,647 B2 *   11/2009   Stephens et al. ...................... 1/1

* cited by examiner

*Primary Examiner* — Cao "Kevin" Nguyen
(74) *Attorney, Agent, or Firm* — Gates & Cooper LLP

(57) ABSTRACT

A method, apparatus, and article of manufacture provide the ability to import a first data model into a meta-data representation in one or more computers. An import wizard or graphical user interface is invoked and guides a user through a process of importing the first data model into the meta-data representation. A source is selected that specifies database connectivity information of a source database containing the first data model. A schema is selected from the selected source, from which tables will be imported into the meta-data representation. A list of all table names within the selected schema is retrieved and displayed. Tables are selected from the list of all table names to import into the meta-data representation. Table information, for all of the selected tables, is populated into the meta-data representation.

12 Claims, 4 Drawing Sheets

OPEN MODEL INGESTION FOR MASTER DATA MANAGEMENT

BACKGROUND OF THE INVENTION

1. Field of the Invention

This invention relates in general to managing business critical data in a computer, and in particular, to importing a data model from any source and expressing the data model in a standard format.

2. Description of Related Art

Master Data Management™, available from the assignee of the present invention, is an application that allows users to manage their business critical data. This critical data can originate from a myriad of sources and external feeds, but ultimately, the goal is that all of this data be consolidated into a central business data warehouse. Master Data Management™ is the process and framework for maintaining a series of business rules and process workflows that will manage this data as it feeds in from multiple sources. Master Data Management™ then applies these business rules and process workflows to produce "master" data, which is then fed to all consuming business processes.

Core to the management of master data is the definition of a data model. The data model serves as the foundation for all business rules and workflow processes within the Master Data Management™ framework. The data model represents the form the master data must ultimately take in the customer's data warehouse to be used by the consuming business applications.

Today, many customers have existing data models. These may be represented/created through a data modeling tool, such as ERWIN™ or EMBARCADERO™. These models may exist as a physical database on a Relational Database Management System (RDBMS). Or, these models may exist in some other, undetermined format. Further, such a model may represent significant investment on the part of the customer, and the model needs to be recreated within the Master Data Management™ framework. Often times, these data models contain several hundred tables, thousands of attributes or columns, and a large number of primary key, foreign key, index, constraint, and other table linkage information.

Prior to this invention, users would have to manually recreate their data model in the Master Data Management™ framework—this is necessary so that business rules and workflow processes will understand the data. This process can take several weeks or months to define manually.

Accordingly, what is needed is a method, apparatus, and article of manufacture that allows a user to easily and efficiently import data from a variety of data models into a standard format.

SUMMARY OF THE INVENTION

Open model ingestion provides the ability to ingest a pre-existing data model into master data on a Master Data Management™ framework from any existing model source (e.g., a Relational Database Management System, an ERWIN™ data model [created using an ERWIN™ data modeling tool], XML files, etc.). This represents a significant optimization to the process of implementing Master Data Management™ at a customer site.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Hardware and Software Environment

Master data (sometimes referred to as reference data) are facts that define a business entity, facts that may be used to model one or more definitions or view of an entity. Entity definitions based on master data provide business consistency and data integrity when multiple systems across an organization (or beyond) identify the same entity differently (e.g., in differing data models).

Business entities modeled via master data are usually customer, product, or finance. However, master data can define any entity, like employee, supplier, location, asset, claim, policy, patient, citizen, chart of accounts, etc.

A system of record is often created or selected (also referred to as a trusted source) as a central, authenticated master copy from which entity definitions (and physical data) are propagated among all systems integrated via a Master Data Management™ framework 100.

The system of record can take many forms. Many users build a central database (e.g. a data warehouse or operational data store) as a hub through which master data, metadata, and physical data are synchronized. Some hubs are simply master files or tables that collect and collate records.

Regardless of the technology approach, the goal of the system of record is to provide a central mechanism for collecting and sharing consistent definitions, usually across otherwise unrelated systems. The improved Master Data Management™ framework of the invention provides a practice of defining and maintaining consistent definitions of business entities, and sharing such definitions across multiple systems.

Figure 1:
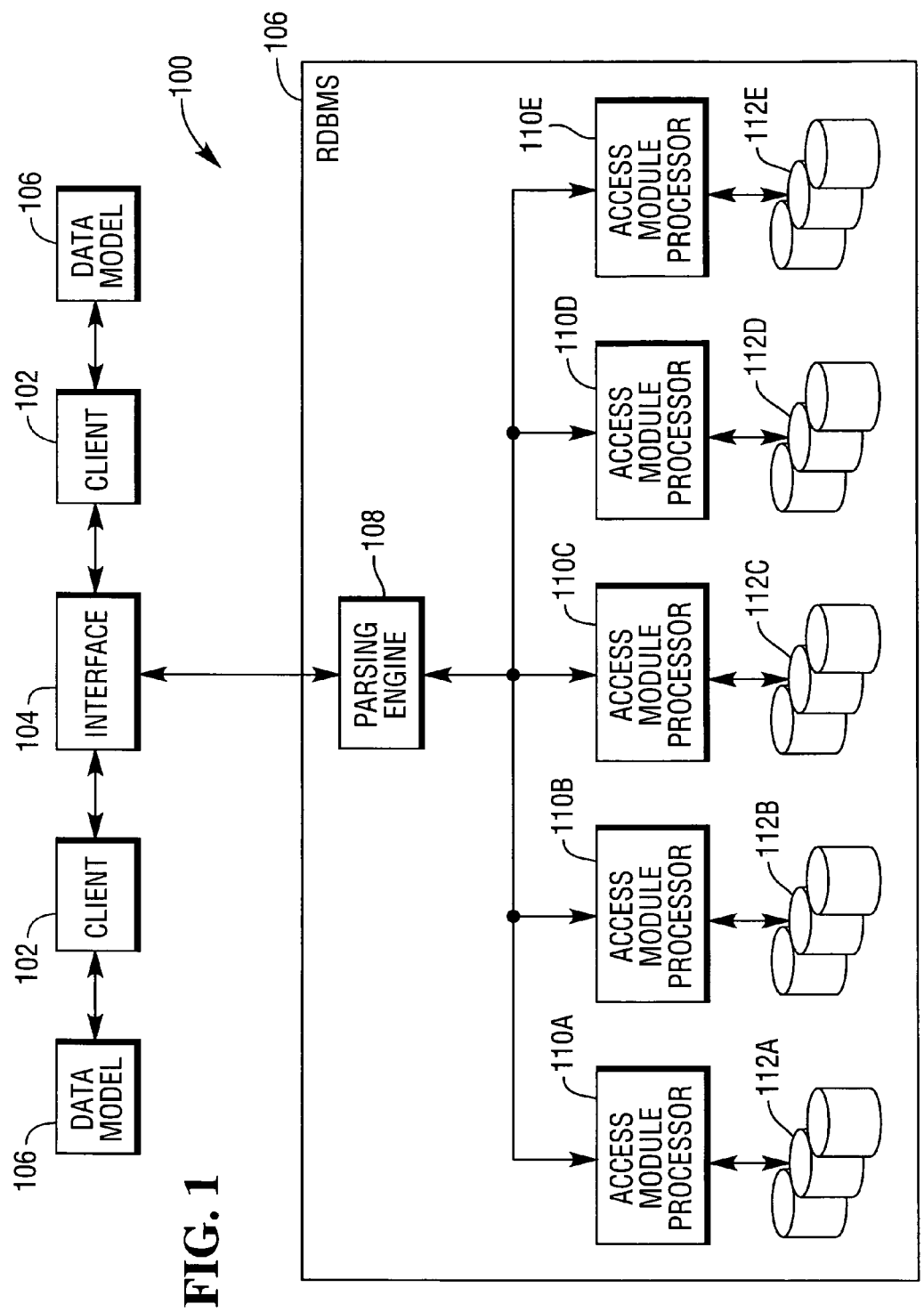
FIG. 1 illustrates an exemplary hardware and software environment according to the preferred embodiment of the present invention.

FIG. 1 illustrates an exemplary hardware and software environment according to the preferred embodiment of the present invention. In the exemplary environment, a computer system 100 implements an improved Master Data Management™ framework 100, in a three-tier client-server architecture, wherein the first or client tier provides clients 102 that may include, inter alia, a graphical user interface (GUI), the second or middle tier provides an interface 104 for performing functions and interfacing with a central database or data warehouse as described later in this application, and the third or server tier comprises the central database or data warehouse (also referred to as a Relational DataBase Management System (RDBMS) 106) that stores data and metadata in a relational database. Such an RDBMS 106 is utilized to store the master data and provide a standard format within framework 100 for the master data. The first, second, and third tiers may be implemented in separate machines, or may be implemented as separate or related processes in a single machine.

In the preferred embodiment, the RDBMS 106 includes at least one parsing engine (PE) 108 and one or more access module processors (AMPs) 110A-110E storing the relational database in one or more data storage devices 112A-112E. The parsing engine 108 and access module processors 110 may be implemented in separate machines, or may be implemented as separate or related processes in a single machine. The RDBMS 106 used in the preferred embodiment comprises the Teradata® RDBMS sold by Teradata™ US Inc, the assignee of the present invention, although other DBMS's could be used.

Generally, clients 102 include a graphical user interface (GUI) for operators or users of the system 100, wherein requests are transmitted to the interface 104 to access data stored in the RDBMS 106, and responses are received therefrom. In response to the requests, the interface 104 performs the functions described below, including formulating queries for the RDBMS 106 and processing data retrieved from the RDBMS 106. Moreover, the results from the functions performed by the interface 104 may be provided directly to clients 102 or may be provided to the RDBMS 106 for storing into the relational database. Once stored in the relational database, the results from the functions performed by the interface 104 may be retrieved more expeditiously from the RDBMS 106 via the interface 104. Further, each client 102 may have other data models 106.

Note that clients 102, interface 104, and RDBMS 106 may be implemented in separate machines, or may be implemented as separate or related processes in a single machine. Moreover, in the preferred embodiment, the system 100 may use any number of different parallelism mechanisms to take advantage of the parallelism offered by the multiple tier architecture, the client-server structure of the client 102, interface 104, and RDBMS 106, and the multiple access module processors 110 of the RDBMS 106. Further, data within the relational database may be partitioned across multiple data storage devices 112 to provide additional parallelism.

Generally, the clients 102, interface 104, RDBMS 106, parsing engine 108, and/or access module processors 110A-110E comprise logic and/or data tangibly embodied in and/or accessible from a device, media, carrier, or signal, such as RAM, ROM, one or more of the data storage devices 12A-112E, and/or a remote system or device communicating with the computer system 100 via one or more data communications devices.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

As described above, the data model represents the form the data must take in a customer's data warehouse 106 to be used by a particular client 102 (e.g., a consuming business application). However, data models may contain several hundred tables, thousands of attributes or columns, and a large number of primary key, foreign key, index, constraint, and other table linkage information. Further, multiple different RDBMSs 106 may be used by different clients for data stored in different models.

The improved Master Data Management™ framework 100 of the invention assures data definition, structure, and consistency for all data across all clients 102. Prior to this invention, users 102 would have to manually recreate their data model in the Master Data Management™ framework 100 (e.g., manually recreate the data from one data model into the master data model). Such a recreation can take several weeks or months to define manually.

One or more embodiments of the invention utilize the interface 104 to provide for open model ingestion. A pre-existing data model is ingested into the improved Master Data Management™ framework 100 from any existing model source (e.g., a RDBMS 106, an ERWIN™ model, or XML [extensible markup language] files). Such an interface represents a significant optimization to the process of implementing an improved Master Data Management™ at a client 102 site.

Open Model Ingestion (OMI) Overview

Interface 104 may include an open model ingestion (OMI) application (also referred to herein as OMI application 104) that imports a data model from any source (e.g., from client 102 or other RDBMS 106), and expresses this model in a standard format (e.g., metadata format) that is specific to a particular entity (e.g., a Teradata™ master data management solution available from the assignee of the present invention).

The OMI application 104 contains the following high level components:

(1) An Import Wizard. This wizard guides the user step-by-step through the process of identifying a model source, identifying the model components to import, and any reconciliation or standardization steps that need to occur.

(2) A generic model ingestion framework. This framework includes abstract interface definitions (the basis for an object oriented design) that specify the process for retrieving data model information.

(3) Source-specific code. This code implements the generic interfaces identified in the previous step for a specific data source. One source-specific code set exists per data source (e.g., RDBMS 106 or modeling tools such as ERWIN™).

(4) Final representation of the data model. The data model is converted from its original source into the Teradata™ Master Data Management™ model definition, which includes one or more folders, with each folder containing one or more "document" (or table) definitions. The model definition also contains a data dictionary that defines all data types used by the model. Finally, the format of the document and dictionary files are an XML format.

Open model ingestion provides a significant competitive advantage when compared to the prior art. Embodiments of the invention allow customers or implementers to import a pre-existing data model into a defined improved Master Data Management™ framework 100 of the invention (e.g., into the format of a meta-data representation [i.e., of a master data model]) within an hour. This represents a significant time savings when compared to other similar solutions which require that the pre-existing model be redefined/recreated manually—a process which can consume weeks or months.

Open Model Ingestion (OMI) Details

The OMI feature of the invention provides the ability to import a model from any source (i.e. ERWIN™, EMBARCADERO™, physical DDL [document definition language] statements, etc.). As described above, the "ingestion framework" is not specific to the source from which a model is imported. The ingestion framework includes steps for creating new import wizards, model wizard steps, and the overall ingestion process, which are not specific to a particular data model (e.g., ERWIN™ or DDL specific).

Requirements

This section documents the requirements for Open Model Ingestion (OMI) in accordance with the invention.

(1) The ability to import a data model generated by any tool. Embodiments of the invention import from multiple sources, and promote as much reuse as possible. However, some level of tool-specific coding may be utilized for each new import source.

(2) Users'/clients' 102 ability to select a single database/model/source, then select a subset of tables/entities from the specified source to import.

(3) Users'/clients' 102 ability to import the source/database objects directly into a meta-data representation (that may include a data dictionary).

(4) Users ability to modify incoming models, such that they can:
  (a) Resolve data types;
  (b) Import data types directly into a data dictionary;
  (c) Set nomenclature; and
  (d) Alter table definitions by adding/removing/renaming fields.

Ingestion Framework

Some embodiments may provide the ability to import a particular data model. The present invention provides the ability to extend such import capabilities to different types of models. To extend import capabilities, an import strategy is utilized, steps may be added to an import wizard, existing import wizard steps are connected to the new steps, and a model manager may be modified.

Figure 2:
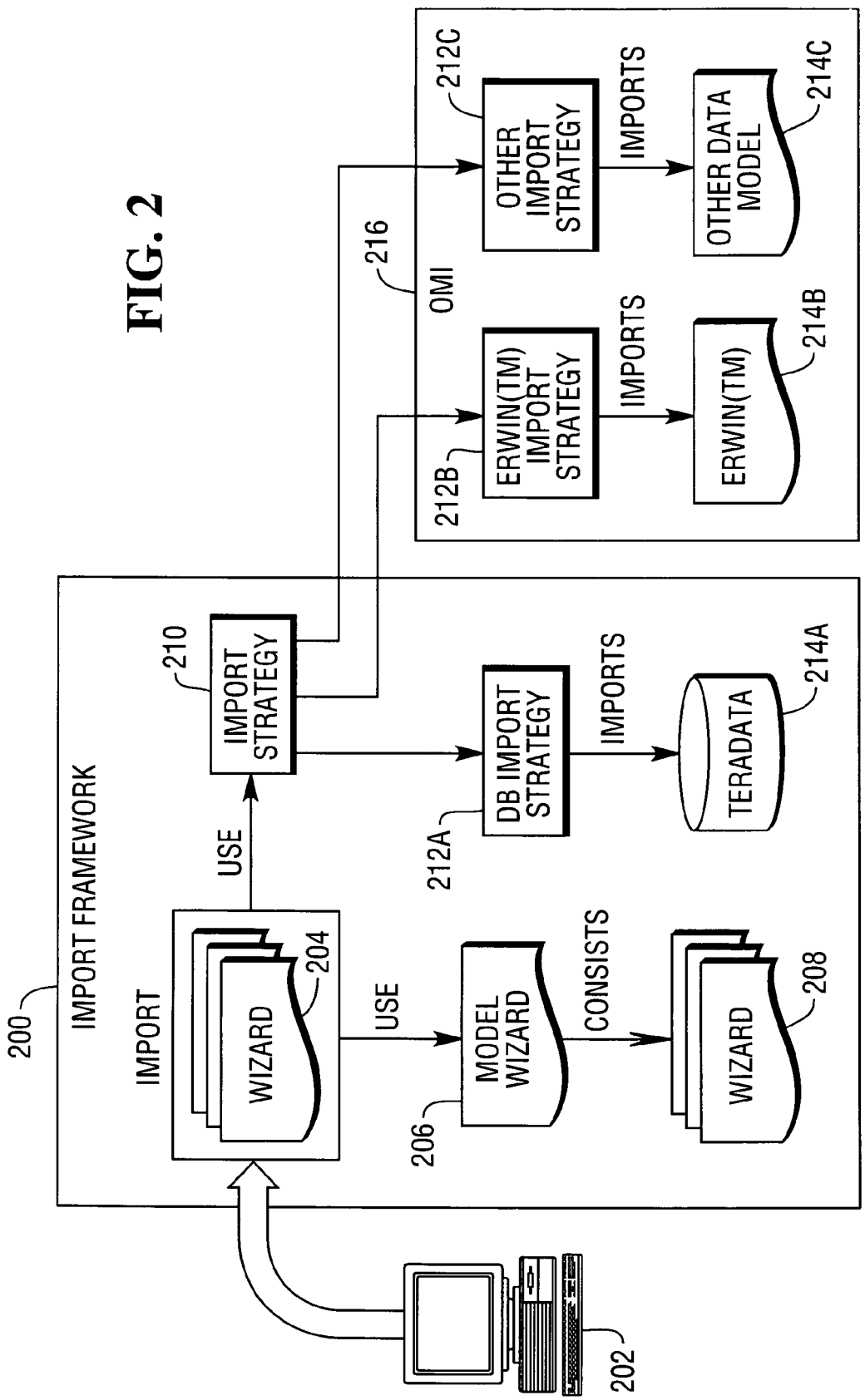
FIG. 2 illustrates an import process in accordance with one or more embodiments of the invention.

FIG. 2 illustrates an import process in accordance with one or more embodiments of the invention. As illustrated, the import/ingestion framework 200 is utilized by a client 202 to conduct an import operation. The client 202 utilizes the import wizard 204 which steps the user through the import process. The import wizard 204 uses model wizards 206 for particular data models. Each model wizard 206 consists of one or more wizard steps 208. The wizard 204 further utilizes an import strategy 210. The import strategy 210 is implemented by various database or data model specific strategies 212A-212C. Each data model strategy 212A-212C imports a particular data model 214A-214C (e.g., Teradata™ RDBMS data model 214A, ERWIN™ data model 214B, or other data model 214C). The open model ingestion 216 provides the open model infrastructure for ingesting/importing data models 214B-214C into the master data management system.

The import/ingestion framework 200 is governed by the import strategy 210. The import strategy 210 is an abstract interface class—specific implementations 212A-212C are provided as necessary to import from new data sources 214A-214C. Some embodiments provide models to be imported from a database (e.g., RDBMS 214A). Accordingly, the various implementations 212A-212C of the import strategy 210 directly support the OMI process 216 using a relational database as the source. For OMI ERWIN™ support (e.g., 212B and 214B), or to support other "sources" of models 214C, another import strategy 212C is implemented. Note that a given import strategy implementation 212A-212C for a specific modeling tool may require updates as new versions of the tools are released.

The import strategy interface 210 is an abstract class that consists of the following methods that are implemented 212A-212C for specific data models 214A-214C:

getSchemaName( )—This method simply returns the schema from which table(s) are being imported. Note that the model import method works only on a single schema. A user needing to import multiple schemas needs to take multiple trips through the import wizard 204.

getTableNames( )—This method returns a sorted list of all table names within the specified schema.

getNecessaryTablesFor( )—This method is called when the user selects tables from an "Available Tables" list and moves them to a "Selected Tables" list. This is part of a "Select Tables" step of the import wizard 204 (see below).

populateDbSchema( )—This method populates the table information for all selected tables. Like the previous method, it is a mix of application-logic and user interface code, as it contains an action listener class (which defines an action that should be performed when a user performs a certain operation) to update the status display to show each table as it is being processed. This method is invoked when users press "Next" on a table selection step of the import wizard 204.

Accordingly, meeting the requirements of OMI 216 may require the implementation of multiple import strategies 212A-212C to support multiple data models 214A-214C. However, there is a significant amount of reuse in the overall import process. Embodiments may include an "import wizard" 204 and "steps" 208 that are leveraged in any new import process. In fact, leveraging such steps provides critical capabilities to properly merge new tables/datatypes (e.g., from data models 214A-214C) into a meta-data representation, and to resolve any/all differences.

Import Wizard

Currently, the process of importing a data model (e.g., from an RDBMS model) is invoked by right-clicking on a graphical representation of the RDBMS model, and selecting an "Import->Relational Database" menu option. Such an action brings up an import wizard 204 screen needed to import a model from a relational database model. A similar invocation of the import wizard 204 may be used to initiate the importation of any first data model (i.e., other data models 214B or 214C) into the meta-data representation 214A (that is different from the first data model). The invocation of the import wizard 204 provides a graphical user interface that guides the user through the process of importing a first data model 214B-214C into the meta-data representation upon which master data model constructs (e.g., workflows, processes, rules, etc.) can be built.

Figure 3:
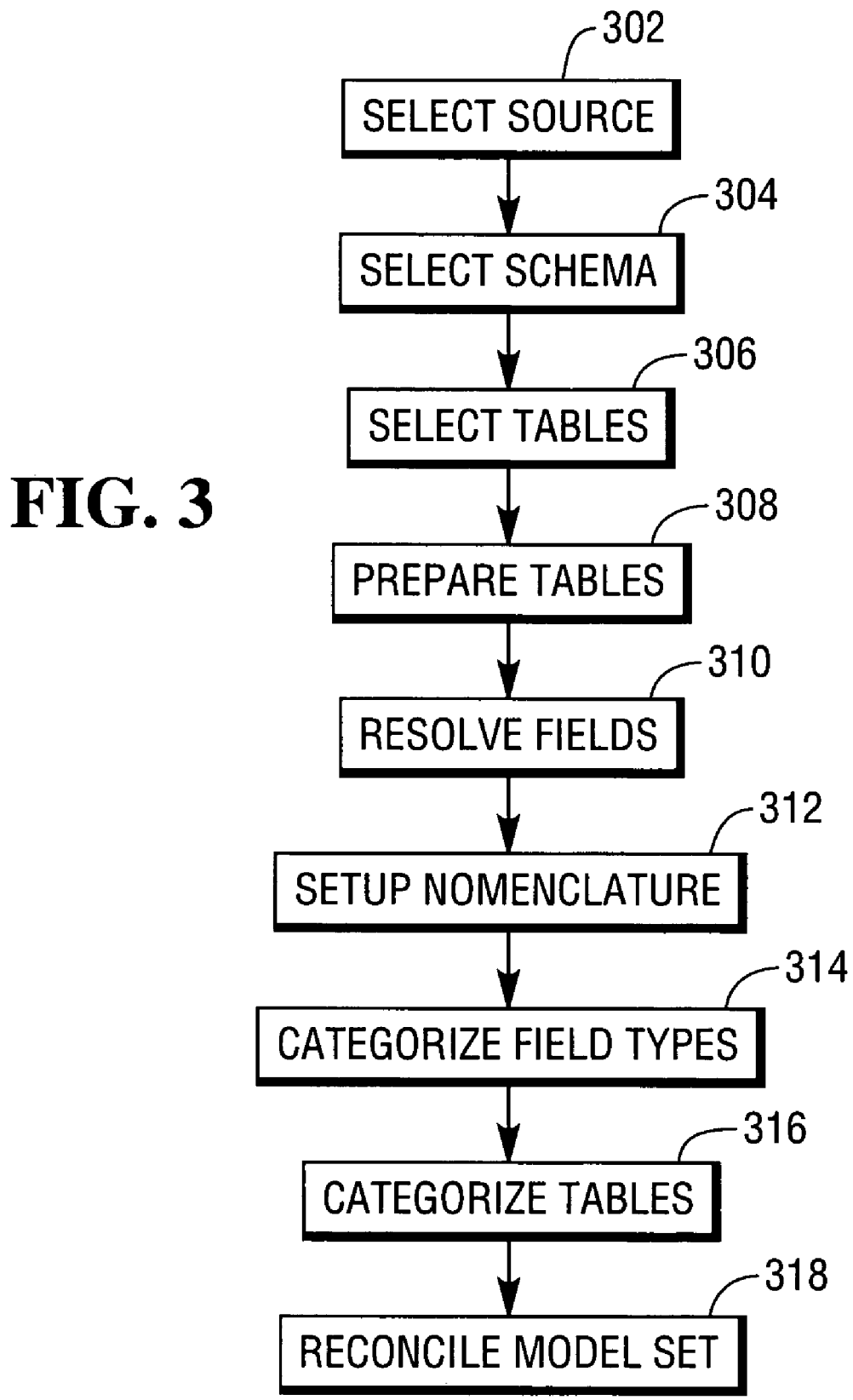
FIG. 3 illustrates the logical flow for importing a data model in accordance with one or more embodiments of the invention.

Overall, there are a number of wizard steps 208 performed when importing from a data model (e.g., relational database model). Such wizard steps 208 are illustrated in further detail in the flow chart of FIG. 3.

At step 302, the source is selected by specifying the connectivity information of the source. Such connectivity information may be database connectivity information if a database model is being imported or an Erwin™ file name if importing from an Erwin™ file. Also note that a model wizard 206 may be specified here. Such a step 302 identifies the location of the source to be imported.

At step 304, in a relational database importation process, a schema is selected by selecting a single database, from the selected source, from which tables will be imported into the existing model.

At step 306, one or more tables are selected from the schema to import into the meta-data representation. Such a selection first retrieves and displays a list of all table names within a selected schema followed by the selection of one or more tables from the list.

At step 308, tables are prepared by configuring (e.g., adding/renaming/removing) fields from a table as it is imported/populated, and also to create synonyms.

At step 310, duplicate fields are resolved.

At step 312, a nomenclature is setup by applying naming conventions, upper/lower cases, add prefix/suffix, etc.

At step 314, field types are categorized by moving data type definitions into a data dictionary that is stored with the meta-data representation.

At step 316, tables are categorized by organizing tables into folders (help organize the overall model).

At step 318, the model set is reconciled by specifying how the imported tables should be reconciled to the meta-data representation. Such a process may also include populating table information, for all of the selected tables, into the meta-data representation.

Note that of these steps, only the first two steps—"select source" 302 and "select schema" 304 are specific for a particular type of data model (e.g., importing from a relational database). The remaining steps 306-318 are generic, regardless of the source or model type from which a model is being imported. More importantly, the wizard 204 itself is designed simply as a series of steps (e.g., wizard steps 208), and new model wizards 206 can be created that still point to—and reuse—existing wizard steps 208.

Further, any new import wizards 206 may be required to a) Supply wizard screens and steps for:

selecting the source 302 (i.e., identifying the source of the model); and selecting the schema 304 (i.e., selecting from the available schemas from the existing source).

b) Direct that the step subsequent to the "select schema" wizard step 304 is integrated with the remaining steps 306-318 of the import wizard 204.

Thus, steps 302 and 304 are implemented for each data model to be imported into the meta-data representation.

Every import operation must have a "model wizard" file 206. A model wizard file 206 is an XML file (maintained by a model manager), containing or consisting of a series of "steps" 208. The various steps 208 select a source 302 (e.g., database connectivity information), select a target (holds target model and data dictionary) (i.e., the importation location), select a schema 304 (selected schema to import from), and select documents 308 (a list of selected tables [documents]), while applying rules/preparing tables 308 (lists any rules that are included as part of the import step), resolving field types 310 (lists how data types are resolved), and applying converters (steps 312-318) (lists any data/field converters that must be applied during the import).

Each step 208 has a corresponding class that is referenced by the model manager. The model manager has overall responsibility for loading and saving the model wizard file 206, while the individual classes 208 have responsibility for loading their respective elements.

Each individual "step" class 208 may implement an interface as well as two additional methods that return the contents of the step object as an XML element (referred to as a get element method) and that takes an element and sets it with the values currently held in the object (referred to as an initialize element method).

Adding a new step to the import wizard 204 may require adding additional step(s) 208 to the model wizard 206. Model wizard steps 208 can be added by:

1. Defining the data the new step will hold (i.e. a file path location of type string).
2. Defining a class to hold the data members. This class implements the get element and initialize element methods above, along with getters/setters and constructors as needed.
3. Modify the model manager to recognize the new step, and map the new step by name to the new class created in the previous step.

To extend the import capability to the ERWIN™ data model 214B or other data models 214C, the OMI design:

1. Identifies data required to locate the "source" for a model (i.e., step 302). This may be a file location—i.e. the location of an ERWIN™ model file, or it may be something more complex.
2. Creates screens for the import wizard 204 needed to capture this information.
3. Creates a "step" 208 within the model manager to store and retrieve this information.
4. Creates screens and functionality for an import wizard step 208 to select the schema at step 304 (needed if multiple schemas can be stored within a single source provided by the modeling tool).
5. Identifies/notes that the next or subsequent step (i.e., the step after step 304) is the existing "select table" wizard step 306 of the import process.

ERWIN™ Importation Example

While open model ingestion is described above, a particular component/implementation of the OMI provides the ability to import from an ERWIN™ data model 214B. The import strategy 210 (implemented in 212A-212C) is the key component in creating an import method 212C for any other model 214C. An import strategy 212A-212C will need to be created/implemented (from abstract import strategy 210) for each import source 214A-214C. ERWIN™ files 214B will require an import strategy 212B as well.

The particular import strategy 212A-212C is derived from an interface 210. All new importers 212A-212C must be derived from this interface 210, and must implement the methods described above.

With respect to the getSchemaName( ) method (i.e., step 304 of FIG. 3), the ERWIN™ implementation 212B retrieves a list of schemas for display. The most common usage of ERWIN™ is probably that an ERWIN™ model 214B contains only a single schema/database. However, users 202 may still be presented with a "schema selection" page in the import wizard 204.

The getTableNames( ) method (i.e., step 306 of FIG. 3) returns a sorted list of all table names within the specified schema from the ERWIN™ file 214B.

The getNecessaryTablesFor( ) method (also part of step 306 of FIG. 3) is called when the user selects tables from the "available tables" list and moves them to the "selected tables" list. This is part of the "select tables" step 306 of the Import Wizard 204.

The populateDbSchema( ) method (i.e., steps 308-318 of FIG. 3) populates the table information for all selected tables. Like the previous method, it is a mix of application-logic and user interface (UI) code, as it contains an action listener class to update the status display to show each table as it is being processed. This method is invoked when users press "next" on the table selection step of the import wizard 204.

For each table, the populateDbSchema( ) method adds the following information:
- Table itself
- Columns (as Properties)
- Column Info, including:
  - Column type
  - Column size
  - Column is nullable
  - Default value
  - Precision
  - Fractional digits
- Table Constraints
- Primary Keys
- Unique Keys
- Indexes
- Foreign Keys The output of this method is a database document representing the table, with all of the above information located within the database document data members.

Much of the actual ERWIN™-specific work (the code that interfaces with the ERWIN™ model 214B directly) is contained in a helper class, called ERWINPlus.

The ERWINPlus class implements the following methods:
- getAllTableNames( )—returns a list of all tables belonging to a schema;
- getAllColumnNames( )—returns a list of columns for a given schema/table;
- getAllColumnDetail( )—returns a collection of column detail info for the columns in a schema/table;
- getPrimaryKeyNames( )—returns the list of primary key names for a schema/table;
- getPrimaryKeys( )—returns the list of primary keys for a given schema/table;
- getUniqueKeyNames( )—returns the list of unique key names for a given schema/table;
- getUniqueKeys( )—returns the list of unique keys for a given schema/table;
- getForeignKeys( )—returns the list of foreign keys for a given schema/table;
- getIndexNames( )—returns a list of index names for a given schema/table;
- getIndexes( )—returns a list of indices for a given schema/table;
- getConstraintInformation( )—returns constraint info for the tables being loaded; and
- getSchemas( )—returns a list of schemas from the model.

The ERWIN™ import strategy 212B directly accesses the ERWIN™ data model 214B through the ERWINPlus class. The ERWINPlus class is a wrapper class that accesses the ERWIN™ data model 214B and aggregates results into the format required by the ERWIN™ ImportStrategy 212B. The ERWINPlus class accesses ERWIN™ model data 214B through an application programming interface (API) (e.g., a COM component that is installed with the ERWIN™ product). This API provides the ability to directly access ERWIN™ model 214B components, and to access sub-components of each component.

An XML-based approach (to represent the meta-data) may also be used wherein a series of JAVA™ classes are generated that can be used to import (marshal) an XML document. ERWIN™ models 214B can be exported into an XML format (i.e., of the meta-data representation).

The following information can be retrieved—if available—from ERWIN™ data models 214B, and imported into the appropriate master data manager structure:

| ERWIN ™ Object | Master Data Management | Comment |
| --- | --- | --- |
| Model | Model | Only 1 model can be imported at a time |
| Entities/Tables | Document | |
| Logical Table Name | Document: Logical Table Name | May or may not be set |
| Physical Table Name | Document: Physical Table Name | May or may not be set |
| Attributes/Columns | Properties | Includes names, datatypes, defaults, nullability, valid domain lists etc. |
| Key Groups | Primary Keys | Type = "PK" |
| Key Groups | Foreign Keys | Type = "IF" (plus a number) |
| Relationships | Unique Keys | Type = "PK" or "AK" |
| Indexes | Indexes | If available in ERWIN ™ |
| Validation Rules | Constraints | |
| Subject Areas | Folders within a Model | |

The following table lists the various data types that can be found in ERWIN™ data models 214B, and the data type this will ultimately map to in a master data management framework 100. Note that the data type may initially be mapped to an existing JAVA™ type code and then to a valid master data management type.

| ERWIN ™ Data Type | JAVA ™ Type Mapping | Master Data Management Type |
| --- | --- | --- |
| Varchar | Varchar | String |
| Char | Char | String |
| Date | Date | DateTime |
| Time | Time | TimeStamp |
| Integer | Integer | Integer |
| Decimal | Decimal | Float |
| Audio | Blob | String |
| Binary | Binary | String |
| Boolean | Boolean | String |
| Byte | Integer | Integer |
| Datetime | Date | DateTime |
| Float | Float | Float |
| Huge | Varchar | String |
| Interval | Date | DateTime |
| Image | Blob | String |
| Large_Binary | LongVarBinary | String |
| Long | Numeric | Integer |
| Long_Text | LongVarChar | LongString |
| Money | Numeric | Integer |
| Nchar | Varchar | String |
| Number | Numeric | Integer |
| Nvarchar | Varchar | String |
| SecurityId | Blob | String |
| ShortFloat | Float | Float |
| Smallint | SmallInt | Integer |
| Text | Varchar | String |
| Timestamp | Timestamp | TimeStamp |
| UniqueId | Integer | Integer |
| Video | Blob | String |

Of all of the import wizard steps 208 described above (i.e., in FIG. 3), only three may be required for implementation of an ERWIN™ data model 214B (i.e., in ERWIN™ import strategy 212B):

Specify ERWIN™ source file (step 302). This step contains a browser button allowing users to browse for the ERWIN™ model file 214B, as well as a browse button to specify the model manager file.

Links to the select schema step 304.

Specify model/schema name (step 304). This step reads the model name from the specified ERWIN™ file 214B, and provides the users an opportunity to change the model name.

Links to the select tables step 306.

Select tables (step 306). Users select the tables from the schema that they desire to import. However, an ERWIN™-specific implementation of this import step is required, so that users can optionally preserve their ERWIN™ model subject areas. Subject areas are simply groupings of tables into areas. In the master data management framework, subject areas translate into grouping documents into folders.

Links to the prepare tables step 308.

In view of the above, the wizard 204 presents a series of steps (designated as steps 208 in FIG. 2 and steps 302-318 of FIG. 3) in a graphical user interface (e.g., a simple window) that allows the users to navigate and define the import/ingestion operation.

Automatic Reconciliation of New Model Objects

The above described open model ingestion feature may be tied to an import process in which individual model objects had to be individually reconciled back to the current meta-data representation. Put another way, while users may quickly import a model from a source such as an ERWIN™ data model 214B, the final step in the import process require the user to manually reconcile each data type and each table back to the meta-data representation (i.e., at step 318). Such manual reconciliation may be performed so that if the user is re-importing an existing meta-data representation, changes to individual items can be reconciled, rather than simply adding them to the existing meta-data representation.

In a primary use case for the open model ingestion feature, the user has an empty model (i.e., meta-data representation), and the goal is to import all model objects from a source into the current meta-data representation. Without the automatic reconciliation feature described below, users would have to select the "Add to Target" reconciliation option for each data type and for each table. In a large model, this could result in well over ten thousand (10000) mouse clicks, and could take several hours, simply to complete this final step 318 in the import process, when really, the user just wants to automatically import all data types and table definitions into the current meta-data representation (e.g., the master data model).

Accordingly, automatic reconciliation represents a significant optimization of the model ingestion process by allowing users with a single click to import all new data types and table definitions. This optimization allows a large model to be imported in less than 30 minutes, rather than the several hours that could be consumed by a manual reconciliation operation.

Figure 4:
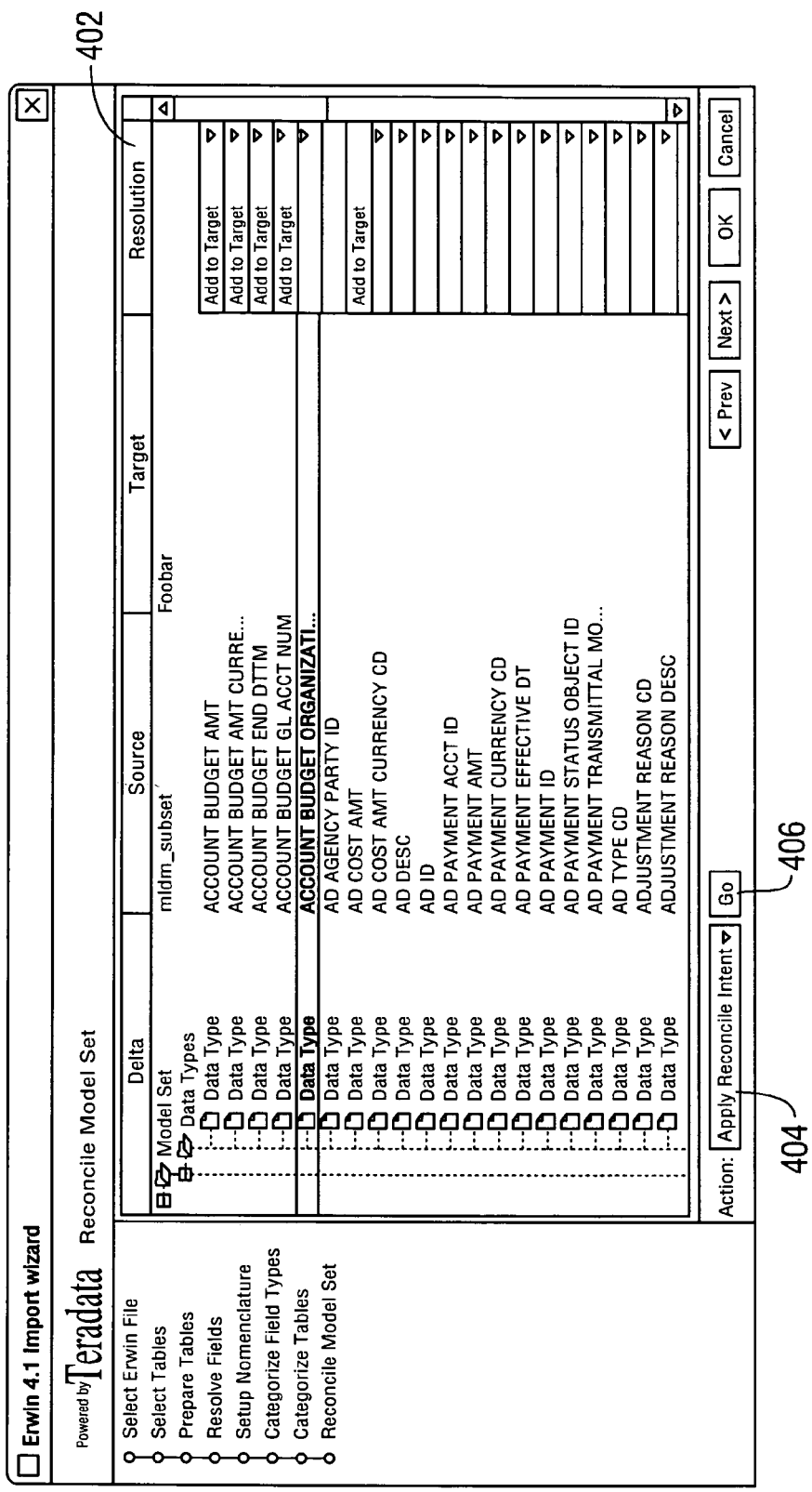
FIG. 4 illustrates a screen shot of an import wizard used to reconcile a model in accordance with one or more embodiments of the invention.

With automatic reconciliation, the final step 318 of the master data management import wizard 204 (i.e., step 318 of FIG. 3) is optimized. A method of the invention without such automatic reconciliation is illustrated in FIG. 4 wherein users are required to select a reconcile action of "Add to Target" for each data type and table definition. As illustrated, the user is manually specifying a reconcile action in the resolution column 402, then selecting the global action "Apply Reconcile Intent" 404 which applies the specified reconcile intent (specified in column 402) to all data types and table definitions.

One or more embodiments of the invention simply add a global action called "Add All To Target" (e.g., to the menu button on the bottom left—enabling the activation of a down arrow adjacent to the apply reconcile intent text 404). When the user selects the "Add All To Target" action and presses the "Go" button 406, all data types and documents (tables) that do not exist in the current meta-data representation will automatically be added to the current meta-data representation. Accordingly, the user will not have to specify a reconcile action for each individual data type and table definition. Instead, once utilized, the resolution 402 for every data type and table will automatically be set to "Add to Target".

Thereafter, the intent for each data type and table (also known as "documents" internally) is set to "Add to Target" and applied accordingly. The net result of such a process is that simply by selecting the proper global action and pressing the "Go" button 406, every data type and table that does not already exist in the model will be automatically added.

In view of the above, automatic reconciliation allows users to select a single global action of "Add All To Target", and press a "Go" button 406. All data type and table definitions are then automatically added (i.e., without additional user input) into the current meta-data representation with a single mouse click, saving the user several hours of tedious work. Accordingly, the user may select an option to add all data types and tables from a first data model to a meta-data representation, wherein the selected option enables an automatic addition of all data types and tables without the user having to specify a reconcile action for each data type and table individually (and manually).

CONCLUSION

This concludes the description of the preferred embodiment of the invention. The following paragraphs describe some alternative embodiments for accomplishing the same invention.

In one alternative embodiment, any type of computer or configuration of computers could be used to implement the present invention. In addition, any database management system, decision support system, on-line analytic processing system, or other computer program that performs similar functions could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of importing a first data model into a meta-data representation in one or more computers, comprising:

(a) invoking an import wizard comprising a graphical user interface that guides a user through a step-by-step process of importing the first data model into the meta-data representation, wherein the meta-data representation comprises a relational database management system (RDBMS);

(b) selecting a source, using the import wizard, that specifies connectivity information of a source containing the first data model to be imported;

(c) selecting a schema, using the import wizard, from the selected source, from which tables will be imported into the meta-data representation;

(d) retrieving and displaying, using the import wizard, a list of all table names within the selected schema;

(e) selecting, using the import wizard, one or more tables from the list of all table names to import into the meta-data representation;

(f) selecting, using the import wizard, an option to add all data types and tables from the first data model to the meta-data representation, wherein the selected option enables an automatic addition of all data types and tables from the first data model to the meta-data representation without the user having to specify a reconcile action for each data type and table; and (g) importing the first data model into the meta-data representation by populating table information for all of the selected one or more tables into the RDBMS based meta-data representation.

2. The method of claim 1, further comprising:
preparing the selected tables by configuring fields from each selected table as the table information is being populated;
resolving one or more duplicate fields in each selected table;
setting up a nomenclature for the table information;
categorizing field types for the table information;
categorizing the selected tables into folders; and
reconciling the second data model by specifying how the selected tables from the first data model should be reconciled to the meta-data representation.

3. The method of claim 1, wherein the (f) populating comprises adding the following information, for each of the selected one or more tables, to the meta-data representation:
(i) the table;
(ii) a column as a property of the table;
(iii) column information for each column comprising:
(1) a column type;
(2) a column size; and
(3) a default value;
(iv) a table constraint;
(v) a primary key;
(vi) a unique key;
(vii) an index; and
(viii) a foreign key.

4. The method of claim 1, wherein the (b) selecting a source step and (c) selecting a schema name step comprise implementations of an object oriented abstract interface, wherein the implementations are specific to the meta-data representation.

5. An apparatus for importing a first data model into a meta-data representation, comprising:
(a) a computer;
(b) logic, performed by a computer, for importing a first data model into a meta-data representation in the computer, wherein the logic comprises:
(i) invoking an import wizard comprising a graphical user interface that guides a user through a step-by-step process of importing the first data model into the meta-data representation, wherein the meta-data representation comprises a relational database management system (RDBMS);
(ii) selecting a source, using the import wizard, that specifies database connectivity information of a source database containing the first data model to be imported;
(iii) selecting a schema, using the import wizard, from the selected source, from which tables will be imported into the meta-data representation;
(iv) retrieving and displaying, using the import wizard, a list of all table names within the selected schema;
(v) selecting, using the import wizard, one or more tables from the list of all table names to import into the meta-data representation;
(vi) selecting, using the import wizard, an option to add all data types and tables from the first data model to the meta-data representation, wherein the selected option enables an automatic addition of all data types and tables from the first data model to the meta-data representation without the user having to specify a reconcile action for each data type and table; and
(vii) importing the first data model into the meta-data representation by populating table information for all of the selected one or more tables into the RDBMS based meta-data representation.

6. The apparatus of claim 5, wherein the logic further comprises:
preparing the selected tables by configuring fields from each selected table as the table information is being populated;
resolving one or more duplicate fields in each selected table;
setting up a nomenclature for the table information;
categorizing field types for the table information;
categorizing the selected tables into folders; and
reconciling the second data model by specifying how the selected tables from the first data model should be reconciled to the meta-data representation.

7. The apparatus of claim 5, wherein the (vi) populating comprises adding the following information, for each of the selected one or more tables, to the meta-data representation:
(1) the table;
(2) a column as a property of the table;
(3) column information for each column comprising:
(4) a column type;
(5) a column size; and
(6) a default value;
(7) a table constraint;
(8) a primary key;
(9) a unique key;
(10) an index; and
(11) a foreign key.

8. The apparatus of claim 5, wherein the (b) selecting a source step and (c) selecting a schema name step comprise implementations of an object oriented abstract interface, wherein the implementations are specific to the meta-data representation.

9. An article of manufacture comprising one or more storage devices tangibly embodying instructions that, when executed by one or more computer systems, result in the computer systems performing a method for importing a first data model into a meta-data representation, wherein the logic comprises:
(a) invoking an import wizard comprising a graphical user interface that guides a user through a step-by-step process of importing the first data model into the meta-data representation, wherein the meta-data representation comprises a relational database management system (RDBMS);
(b) selecting a source, using the import wizard, that specifies database connectivity information of a source database containing the first data model to be imported;
(c) selecting a schema, using the import wizard, from the selected source, from which tables will be imported into the meta-data representation;
(d) retrieving and displaying, using the import wizard, a list of all table names within the selected schema;
(e) selecting, using the import wizard, one or more tables from the list of all table names to import into the meta-data representation;
(f) selecting, using the import wizard, an option to add all data types and tables from the first data model to the meta-data representation, wherein the selected option enables an automatic addition of all data types and tables from the first data model to the meta-data representation without the user having to specify a reconcile action for each data type and table; and (g) importing the first data model into the meta-data representation by populating table information for all of the selected one or more tables into the RDBMS based meta-data representation.

10. The article of manufacture of claim 9, wherein the method further comprises:

preparing the selected tables by configuring fields from each selected table as the table information is being populated;

resolving one or more duplicate fields in each selected table;

setting up a nomenclature for the table information;

categorizing field types for the table information;

categorizing the selected tables into folders; and reconciling the second data model by specifying how the selected tables from the first data model should be reconciled to the meta-data representation.

11. The article of manufacture of claim 9, wherein the (f) populating comprises adding the following information, for each of the selected one or more tables, to the meta-data representation:
  (i) the table;
  (ii) a column as a property of the table;
  (iii) column information for each column comprising:
    (1) a column type;
    (2) a column size; and
  (iii) a default value;
  (iv) a table constraint;
  (v) a primary key;
  (vi) a unique key;
  (vii) an index; and
  (viii) a foreign key.

12. The article of manufacture of claim 9, wherein the (b) selecting a source step and (c) selecting a schema name step comprise implementations of an object oriented abstract interface, wherein the implementations are specific to the meta-data representation.

* * * * *